July 12, 1927.
G. R. DAVENPORT
INTERNAL COMBUSTION ENGINE
Filed Aug. 28, 1926
1,635,266
3 Sheets-Sheet 1
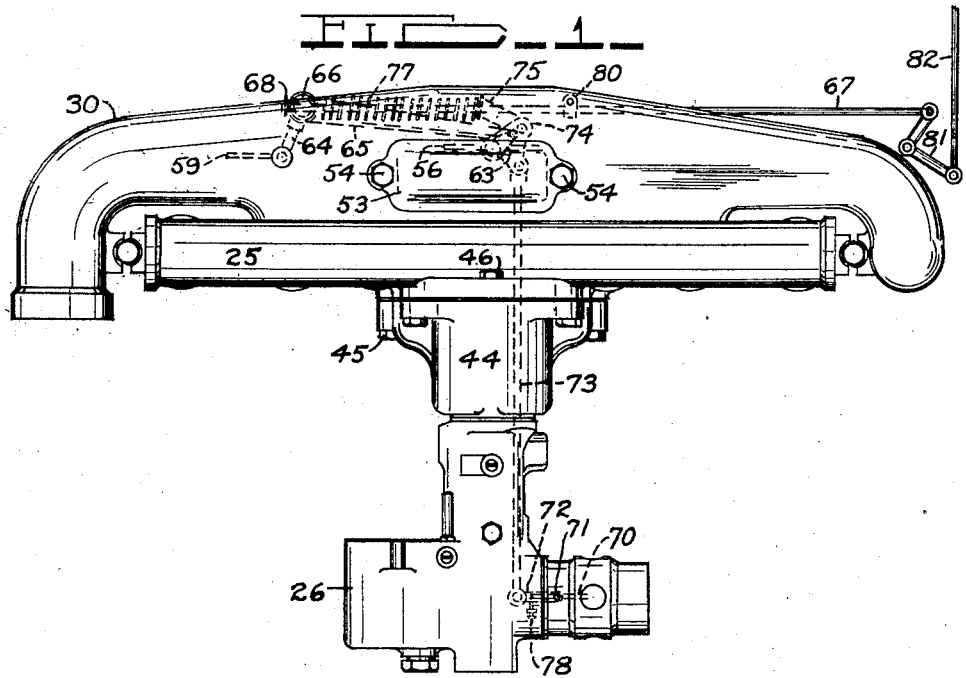
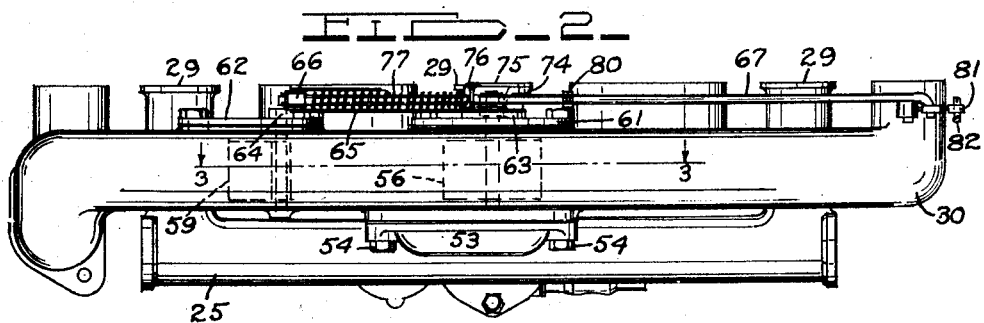
INVENTOR
GEORGE R. DAVENPORT
BY
ATTORNEY

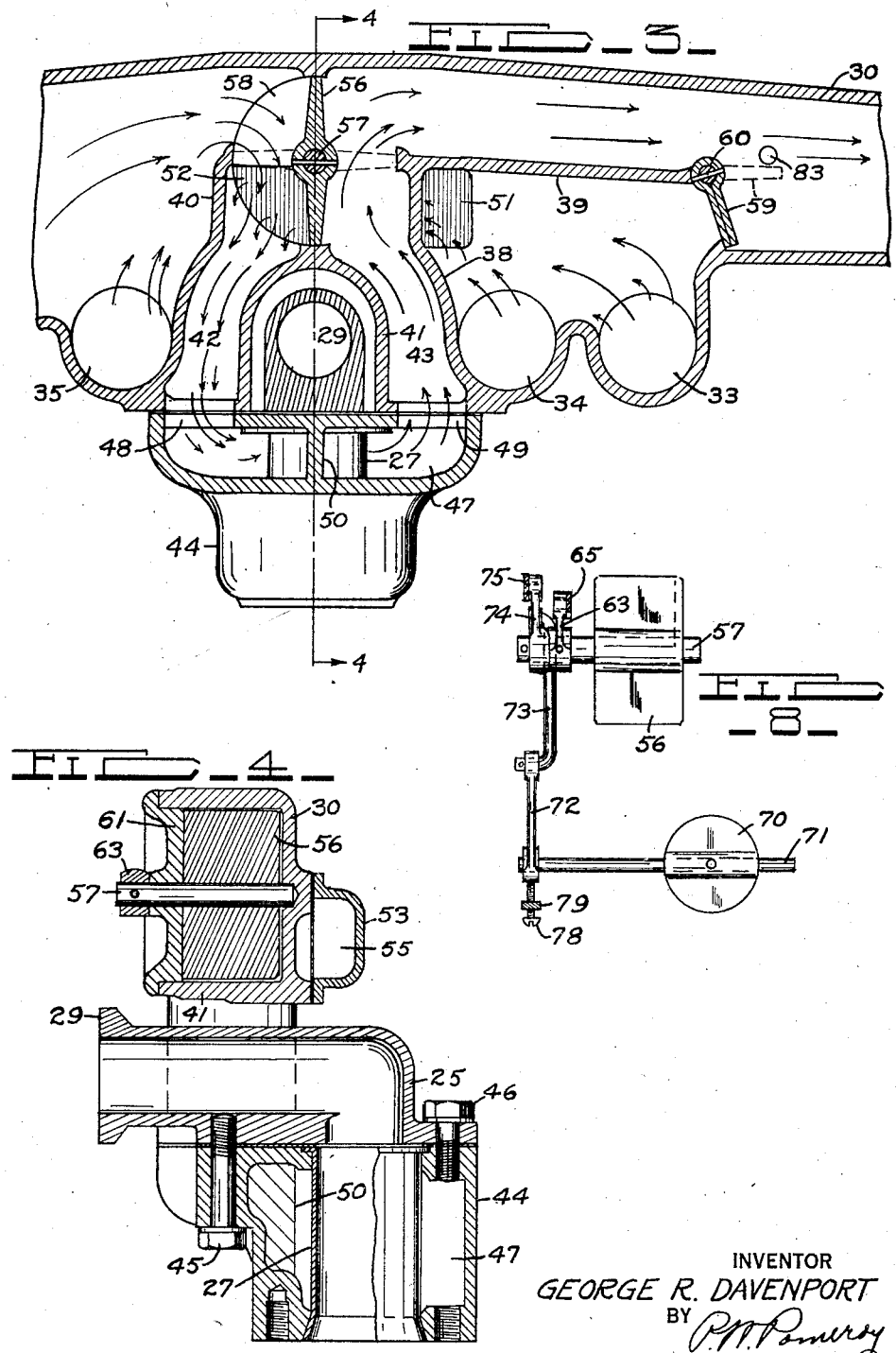

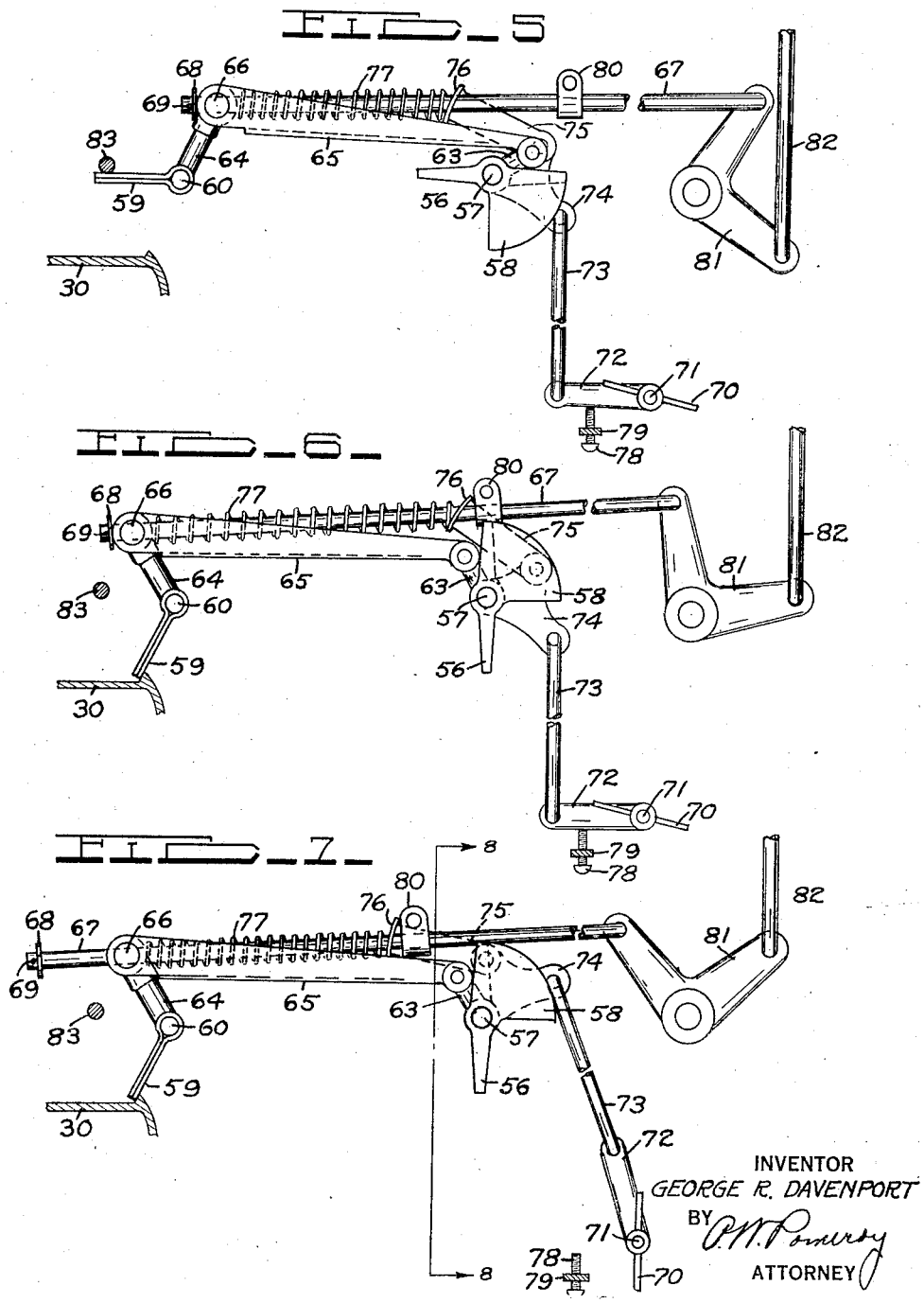

Patented July 12, 1927.

1,635,266

UNITED STATES PATENT OFFICE.

GEORGE R. DAVENPORT, OF ROYAL OAK, MICHIGAN, ASSIGNOR TO THE STUDEBAKER CORPORATION, OF SOUTH BEND, INDIANA, A CORPORATION OF NEW JERSEY.

INTERNAL-COMBUSTION ENGINE.

Application filed August 28, 1926. Serial No. 132,198.

This invention relates to internal combustion engines, and particularly to controlling means for heating the combustible mixture and choking the carbureter, the principal objects being to provide a new and novel means whereby the carbureter may be choked by the same means that are used for controlling the temperature of the combustible mixture.

Another object is to provide a manifolding system for an internal combustion engine in which valvular means are employed for regulating the amount of heat transferred from the exhaust gases to the intake manifold, such valvular means being operatively connected to the carbureter choke valve in such a manner as to make the operation of the latter dependent upon the operation of the former.

Another object is to provide a manifolding system for an internal combustion engine in which valvular means disposed within the exhaust manifold are employed to cause the exhaust gases to heat the combustible mixture in the intake manifold, such valvular means being capable of varying at will the amount of heat thus transferred to the combustible mixture and being so connected with the choke valve of the engine carbureter that such carbureter cannot be choked unless the valvular means in the exhaust manifold is in position of greatest heat transfer to the combustible mixture.

Another object is to provide an intake manifold with a jacket in communication with an exhaust manifold, valves being provided in the exhaust manifold for directing at will the gases therein through the said jacket, such valves being interconnected with the carbureter choke valve in such a manner that the single means for controlling such valves also controls the said choke valve and the latter can be operated only when the former are in position to direct the maximum amount of exhaust gases through said jacket.

A further object is to provide a manifold system for an internal combustion engine in which the intake manifold is provided with a jacket communicating with the exhaust manifold, the exhaust manifold being provided with a pair of spaced rotatable valves co-operating with a series of baffles within the exhaust manifold whereby upon operation of said valves a greater or lesser amount of the hot exhaust gases may be directed through the jacket to heat the combustible mixture in the intake manifold, said valves being provided with interconnected levers whereby said valves are restrained to simultaneous movement, a single control rod being slidably connected to one of said levers and being provided with a stop against which the last mentioned lever is urged by a coil spring also employed for normally holding the carbureter choke valve in open position, and a second stop being provided on said rod whereby when said levers are moved to close said valves, a further movement of said rod closes said choke valve against the pressure of said coil spring.

The above being among the objects of the present invention, the same consists of certain features of construction and combinations of parts to be hereinafter described with reference to the accompanying drawings, and then claimed, having the above and other objects in view.

In the accompanying drawings which show a suitable embodiment of the present invention and in which like numerals refer to like parts throughout several different views, Figure 1 is a side view of an exhaust and intake manifold, together with a carbureter, for an internal combustion engine, in which the controlling means forming the subject of the present invention is embodied.

Figure 2 is a top view of Figure 1.

Figure 3 is an enlarged view taken centrally through the exhaust manifold and a portion of the intake manifold as on the line 3—3 of Figure 2, showing the valves and baffles within the exhaust manifold which are employed for directing the exhaust gases through the jacket surrounding a portion of the intake manifold.

Figure 4 is a sectional view taken transversely of the exhaust and intake manifolds as on the line 4—4 of Figure 3.

Figure 5 is a diagrammatic view of the controlling means showing the relation of the various parts when no heat is being transferred to the intake manifold and the carbureter choke valve is in full open position.

Figure 6 is a view similar to Figure 5 but showing the relation of the various parts when full heat is being transferred to the intake manifold and the carbureter choke valve is still in full open position.

Figure 7 is a view similar to Figure 5 but showing the relation of the various parts when full heat is being transferred to the intake manifold and the carbureter choke valve is in fully closed position.

Figure 8 is a section view through the controlling means as on the line 8—8 of Figure 7.

In order to simplify the description of the present invention, the construction and operation of the manifolds will first be described, after which the means for controlling the carbureter choke valve in conjunction with the means for controlling the heat to the intake manifold will be described.

As indicated in the drawings, the intake manifold is of very simple design and comprises a straight cylindrical portion 25 which receives the combustible mixture from the carbureter 26 communicating therewith through the medium of the thin tube 27 extending downwardly therefrom at its center, (see Figure 4), and which distributes the combustible mixture to the different pairs of cylinders enclosed within the engine cylinder block (not shown) by means of the cross passages 29 which communicate with the intake port openings of the various cylinders.

The exhaust manifold 30, which discharges the exhaust gases into a conventional exhaust pipe (not shown) at one end of the engine is positioned closer to the cylinder block than the intake manifold. The manifolds shown are for a multiple cylindered engine and for that reason a plurality of ports or passages, in which are included those shown in the drawings as 33, 34, and 35, connect the exhaust ports of the engine with the interior of the exhaust manifold. The ports or passages are arranged in the conventional order with the passages 33, 34, and 35 and their corresponding adjoining exhaust ports lying in adjacent relationship.

The rear wall of the passage 34, which extends completely across the exhaust manifold 30, is extended upwardly and slightly rearwardly to a point approximately midway the normal depth of the manifold 30 to form a baffle 38, and another baffle 39 continues horizontally across the manifold 30 from the upper edge of the baffle 38 to a point approximately in line with the forward wall of the passage 33. A third baffle 40, similar to the baffle 38 but reversed in direction, extends upwardly from the front wall of the passage 36 to a point in horizontal line with the upper edge of the baffle 38. The lower center portion of the manifold 30 between the baffles 38 and 40 is cored out to allow the center passage 29 of the intake manifold to pass therethrough, thus providing a wall 41 which divides the space between the lower parts of the baffles 38 and 40 into two passageways or ducts 42 and 43 which terminate in a flat surface against which the upper surface of the intake manifold heating jacket 44 is secured by screws such as 45.

The distributor pipe portion 25 of the intake manifold is also secured to the upper surface of the jacket 44 by screws such as 46, and, as previously described, contains the tube 27 which connects the distributor portion 25 of the intake manifold with the carbureter 26. The jacket 44 is a hollow casting in which the tube 27 is centrally located so as to provide a passage 47 therearound between it and the interior walls of the jacket, the tube 27 being of relatively thin metal capable of a quick transfer of heat therethrough and is secured in place by an outwardly extending flange at its upper edge, which is set in flush with the upper face of the jacket 44, and the lower end of which is expanded into the tapered openings in the lower wall of the jacket through which it passes, thus providing an air-tight joint at either end. The rear side of the jacket 44 is extended back toward the center of the engine and is provided with two openings 48 and 49 which connect with and communicate with the passage 47 of the jacket 44 and the ducts 42 and 43 of the exhaust manifold 30. A vertical baffle 50 is provided in the jacket 44 between the openings 48 and 49 and extends from the rear or inner face to a point adjacent the tube 27 so that any gases entering the duct 42 must pass completely around the tube 27 before passing out through the duct 43 and back into the exhaust manifold 30.

An opening 51 is provided in the front or face wall of the exhaust manifold 30 directly under the horizontal baffle 39 and immediately adjacent the vertical baffle 38, and a second opening 52 is provided in the same face between the vertical baffles 38 and 40, this latter opening being the shape of a quarter of a circle with one of its radial sides lying vertical just rearwardly of the center line between the baffles 38 and 40 and extending from the wall 41 to a point in line with the upper edges of the baffles 38 and 40, and its remaining radial side lying horizontally and extending from the center line between the baffles rearwardly to the baffle 40 in line with the upper ends of the baffles 38 and 40. A cored covered plate 53 is secured to the face of the exhaust manifold 30, by screws such as 54, and overlies the openings 51 and 52, its cored-out interior providing a passage 55 connecting the two openings, and therefore connecting that part of the exhaust manifold 31 below the baffle 39 and forwardly of the baffle 38 with the duct 42.

A butterfly valve 56 secured to a rotatable shaft 57 extends between the forward and rear walls of the exhaust manifold 30 midway between the upper ends of the vertical baffles 38 and 40 and the upper end of the wall 41, it being so positioned with respect to the valve 56, that when the valve 56 is turned to horizontal position it extends between the upper ends of the baffles 38 and 40 and completely closes the space therebetween, and when swung to vertical position it extends between the upper end of the wall 41 and the upper wall of the manifold 30 and completely closes the space between these two points. The valve 56 is provided at its forward edge with a radial extension 58 of the same shape as the opening 52, and this extension is so positioned that when the valve 56 is in horizontal position, as indicated by dotted lines in Figure 3, the extension 58 overlies and shuts off the opening 52 and thereby prevents any exhaust gas from circulating through the passage 55.

A second valve 59, secured to the rotatable shaft 60 along one edge thereof, and extending between the front and rear walls of the exhaust manifold, is positioned at the forward edge of the horizontal baffle 39, and is swingable between the horizontal position shown in Figure 3, by dotted lines, to the approximately vertical position shown in Figure 3, by full lines, in which latter position it extends from the forward end of the baffle 39 to the lower wall of the intake manifold, and in which position the exhaust gases from the ports or passages 33 and 34 are prevented from passing thereby.

The valve 56 and shaft 57 are introduced into the exhaust manifold 30 through an opening in the back wall of the manifold which is closed by the cover plate 61 which provides a bearing for the rear end of the shaft 57, and the valve 59 and shaft 60 are introduced in the same manner through an opening which is closed by the cover 62. The shaft 57 is provided with a lever 63 on its inner end which projects back past the cover plate 61, and the shaft 60 is provided with a similar lever 64. The free ends of the levers 63 and 64 are connected together to move in unison by means of a link 65 pivotally connected to each lever. In view of the fact that the valve 59 does not require as great a rotational movement as the valve 56 to move it from one extreme position to the other, the lever 63 is made proportionally shorter than the lever 64 so that when one valve is moved from one extreme position to the other, the other valve is caused to also move between its extreme positions.

The operation is readily apparent. When the levers 63 and 64 are moved to their extreme rearward position the valve 56 extends between the upper ends of the baffles 38 and 40 and closes the space therebetween to the passage of any gases, the extension 58 at the same time covering the opening 52 and preventing any gas from passing therethrough. The valve 59 is caused by the link 65 to also move to a horizontal position as indicated by dotted lines in Figure 3. When the valves 56 and 59 are in this horizontal position, the exhaust gases from the engine entering the passages or ports 35 and those on its side of the baffle 40 pass up over the baffle 40, and the valve 56, baffles 38 and 39 and out of the discharge end of the manifold without coming in contact with any part of the intake manifold. The exhaust gases entering the ports or passages 33 and 34, the passage 55 and opening 52 being blocked by the extension 58, likewise pass directly to the discharge end of the exhaust manifold 30 without coming in contact with any part of the intake manifold.

When full heat is desired on the intake manifold, the levers 63 and 64 are moved to their extreme forward position which moves the valves 56 and 59 to their other extreme position as shown in full lines in Figure 3, the valve 56 turning until it extends between the upper wall of the exhaust manifold and the upper edge of the wall 41, thus preventing the exhaust gases from passing directly thereby. When the valve 56 is thus turned to its vertical position the extension 58 is rotated with it and is moved up and away from the opening 52, uncovering the same. At the same time the forward valve 59, which is connected to the valve 56 through the medium of the levers 63 and 64 and the link 65, is rotated until its free edge abuts against the lower manifold wall as indicated in full lines in Figure 3. When the valve 59 is in this position no exhaust gases from the ports or passages 33 and 34 can pass thereby. The exhaust gases from the ports or passages 35 and the others on the same side of the baffle 40, pass forward over the baffles 40 and at this point their forward progress is stopped by the valve 56 which directs them downward through the duct 42 into the jacket 44 where the baffle 50 causes them to follow the passage 47 around the outer face of the tube 27 and then back on the other side where they pass up through the duct 43 and back into the exhaust manifold 30 over the baffles 38 and 39 and travel forward to the discharge end of the exhaust manifold. At the same time, the exhaust gases entering the exhaust manifold 30 through the ports 33 and 34, are prevented from passing the valve 59, and are forced out through the opening 51 into the exterior passage 55 and then back through the opening 52 into the duct 42 where they mingle with the exhaust gases from the other ports or passages and pass down around the tube 27 and back out the duct 43 as previously explained. It is thus seen that the exhaust gases from the cylinders pass around the thin tube 27 when the valves are in this position, transferring a maximum of heat to the combustible mixture flowing through the tube 27 from the carbureter 26 which is in open communication therewith and which is secured to the bottom face of the jacket 44.

It will be evident that any variation of the position of the valves 56 and 59, between the two extreme positions shown and described, will cause a corresponding variation in the amount of heat transmitted to the combustible mixture through the walls of the tube 27, and that almost any desired amount of heat may be obtained in this way by shifting the rotatable position of the valves 56 and 59.

As previously mentioned, the means for regulating the amount of heat to the intake manifold, which has been shown as being accomplished by changing the position of the valves 56 and 59, is operatively connected up to the carbureter choke valve, so that the operation of both are, to a certain extent, dependent upon one another. The controlling means for these parts will now be described.

The outer end of the lever 64 is provided with a rotatable pin 66 which is employed for pivotally connecting the end of the link 65 thereto, the link 65 at this end being of U-shaped section, (Figure 2), the sides of the U spanning the slotted end of the lever 64 and receiving the extremities of the pin 66. A rod 67, extending longitudinally of the manifold 30 slidably projects through the pin in the slotted portion of the end of the lever 64 and thereby prevents axial displacement of the pin 66. A washer 68 is secured on the end of the rod 67 in normally abutting relation with the pin 66 and is held in place by a pin such as 69 or other suitable means.

The carbureter choke valve 70, which is disposed in the inlet air opening of the carbureter 26 and is capable of being shut so as to restrict the entrance of air thereinto when it is necessary to provide a rich mixture for starting or for running with a cold motor, is secured to a rotatable shaft 71 which is provided with a lever 72 secured thereto on the exterior of the carbureter 26. A link 73 pivotally connects the free end of the lever 72 with the free end of the lower arm of a two armed bell-crank 74 rotatably carried by the shaft 57 upon which the valve 56 is secured. Another link 75 is pivotally secured to the free end of the upper arm of the bell-crank 74 and extends upwardly and forwardly therefrom, its other end being bent at right angles thereto from a head 76 which slidably encircles the rod 67. A coil spring 77, which encircles the rod 67 between the pin 66 and the head 76 and is held under compression therebetween, tends to force the pin 66, and therefore the lever 64, forwardly, and tends to force the head 76 rearwardly. The washer 68 and pin 69 prevent this force from inadvertently moving the lever 64 forwardly, and an adjustable stop 78 carried by a boss 79 on the side of the carbureter 26, and which is adapted to bear against the lever 72 so as to prevent the same from moving the valve 70 past full open position, acting through the link 73, bell-crank 74 and link 75 prevents the force of the spring 77 from moving the head 76 rearwardly. A stop 80, adjustably secured to the rod 67 rearwardly of the normal position of the head 76, has a function that will be described later.

The operation of this last described mechanism will now be explained. In the embodiment of the invention shown, the forward end of the exhaust manifold is considered as the discharge end. For that reason the rod 67 extends rearwardly where it may be connected to any suitable manually operated means on the instrument board of an automobile, or other control point suitably situated in relation to that use to which the present invention is put. In the drawings, by way of illustration, it is shown connected to one arm of a bell-crank 81 whose rotatable position is regulated by a second rod 82. In Figures 5, 6 and 7 are shown the three principal positions of the mechanism as affected by the longitudinal position of the rod 67.

In the first position, as indicated in Figure 5, the rod 67 is in its rear extreme position, that is, it is pulled back as far as it will go. In this position the washer 68 has drawn the pin 66 and free end of the lever 64 back to its extreme rearward position in which the forward valve 59 has been moved to a horizontal position against the stop 83 which is provided on the inside wall of the exhaust manifold 30 for limiting the upward travel of its free end. When the lever 64 is in this position the link 65 which is pivotally connected thereto by the pin 66 has been moved rearwardly and has caused the valve 56 to be placed in a horizontal position between the upper ends of the baffles 38 and 40, with the extension 58 overlying the opening 52. The spring 77 has forced the head 76 of the link 75 back on the rod 67 so that the carbureter choke valve lever 72 abuts against the stop 78 and the choke valve 70 is in full open position. When the valve 56 and 59 are in this position all of the exhaust gases in the exhaust manifold are prevented from entering the jacket 44 as has been previously described. When the rod 67 is in its extreme rearward position then, no heat is being transferred to the intake manifold and carbureter choke valve 70 is in full open or unrestricting position. This position of the mechanism is that which would be utilized when the engine of which it forms a part is running in relatively warm weather.

In the second principal position of the mechanism, as indicated in Figure 6, the rod 67 has been moved forwardly approximately half of its travel, or to a point where the valves 56 and 59 are in closed position while the choke valve 70 is still in full open position. When the rod 67 is thus moved forward, the spring 77 causes the pin 66, and therefore the free end of the lever 64, to follow the washer 68 forward until the free end of the valve 59 abuts against the lower wall of the manifold 30, as indicated, which prevents further movement of the same, and in which position the valve 59 blocks the space between the free end of the baffle 39 and the lower wall of the intake passage and prevents the exhaust gases from passing thereby. At the same time the free end of the lever 63 has been drawn after the free end of the lever 64 by the link 65, and the valve 56 has been turned until it extends between the upper wall of the manifold 30, and the uper edge of the wall 41, thus blocking the exhaust gases flowing towards it through the jacket 44. When the valve 56 is thus turned to its vertical position, the extension 58 is rotated out of position over the opening 52 and the exhaust gases entering the exhaust manifold 30 through the ports 33 and 34 flow therethrough into the duct 42 to mingle with the other exhaust gases and to pass down through the jacket 44. As has been previously described, this position of the valves 56 and 59 is the position in which the greatest transfer of heat to the intake manifold occurs. In this change of position of the rod 67 and the valves 56 and 59, the head 76, link 75 and connecting mechanism down to the valve 70 have remained unchanged in position, although the stop 80 on the rod 67 has moved to a point immediately adjacent the head 76, thus giving the maximum heat to the intake manifold with the carbureter choke valve in wide open position. This position of the mechanism is the one preferably employed when the engine is warmed up and running on a cool or cold day.

In the third principal position of the mechanism, which is indicated in Figure 7, the rod 67 has been moved to its extreme forward position. In this case, inasmuch as the valve 59 is already in abutting relation with the bottom wall of the manifold 30, that is, considering the mechanism as having been moved from the position shown in Figure 6, no further rotation of the same can occur, and consequently no further rotation of the valve 56 can occur. Due to this fact the end of the rod 67 merely slides through the pin 66 as indicated, leaving the position of the valves 56 and 59 unchanged from what they were in Figure 6. When the rod 67 has thus been moved forward from the position shown in Figure 6, the stop 80 has been carried forward a corresponding amount, and when thus carried forward it engages the head 76 of the link 75 and draws the link with the rod 67, at the same time compressing the spring 77. When the link 75 is carried forward in this manner, the bellcrank 74 is rotated and the link 73 is raised, raising the free end of the lever 72 off of the stop 78 and rotating the carbureter choke valve 70 into fully closed position. In this position of the mechanism the valves 56 and 59 are arranged to transmit the maximum heating effect to the intake manifold and the carbureter is being choked as for starting the engine.

From the above it will be evident that any variation in the longitudinal position of the rod 67 between those positions shown in Figures 6 and 7 will result only in a variation in the amount which the carbureter 26 is being choked by the valve 70, while the maximum of heat will be transferred to the intake manifold. Such partly choked carbureter position will be employed on severely cold days before the engine has become warmed up. It will also be evident that any variation in the position of the rod 67 between those positions shown in Figures 5 and 6 will result only in a variation in the amount of heat being transferred to the intake manifold without choking the carbureter to any extent whatever. Not only does this construction simplify the operation of two usually separate mechanisms by employing a single means, but it insures that whenever the carbureter is choked the raw gas which is drawn into the intake manifold during this operation will be far more easily and more quickly vaporized by the application of intense heat thereto than is ordinarily the case when each is left to the separate control of a more or less inexperienced or indifferent engine operator, and insures the minimum effect from those detrimental results which are so likely to occur from the effects of unvaporized gasoline entering the engine cylinders.

Formal changes may be made in the specific embodiment of the invention described without departing from the spirit and substance of the broad invention, the scope of which is commensurate with the appended claims.

What I claim is:

1. In a manifolding system for an internal combustion engine, a valve for directing exhaust gases into contact with the intake manifold, longitudinally movable means for regulating the position of said valve, and a carbureter choke valve co-operatively associated with said means and controlled thereby, said valve being movable from open to closed position in advance of movement of said choke valve.

2. In combination with an internal combustion engine, an intake manifold, an exhaust manifold provided with a valve for causing the exhaust gases to control the temperature of the combustible mixture within said intake manifold, and longitudinally movable means for controlling the position of said valve, said valve being operatively connected with the carbureter choke valve so that said valve may be moved from open to closed position in advance of movement of said choke valve.

3. In combination with an internal combustion engine, an intake manifold, an exhaust manifold associated therewith provided with a valve for controlling the heating effect of the exhaust gases on the combustible mixture within said intake manifold, a carbureter choke valve, and a single longitudinally movable member co-operatively associated with said valve in said exhaust manifold and said choke valve whereby said valve is moved from open to closed position in advance of said choke valve.

4. In combination with an internal combustion engine, an intake manifold, an exhaust manifold co-operatively associated therewith and provided with valvular means for controlling the temperature of the combustible mixture within said intake manifold, a carbureter choke valve, and a longitudinally movable member co-operatively associated with both of said valves whereby said valves are successively operated by longitudinal movement of said member.

5. In combination with an internal combustion engine, an intake manifold, an exhaust manifold co-operatively associated therewith provided with valvular means for controlling the transfer of heat from the exhaust gases to the combustible mixture within said intake manifold, a carbureter choke valve, a longitudinally movable member, and means connecting said valvular means and said choke valve with said member whereby said valvular means are placed in position of maximum transfer of heat to said combustible mixture before said choke valve may be closed.

6. In combination with an internal combustion engine, an intake manifold, an exhaust manifold associated therewith provided with valvular means for controlling the amount of heat transferred by the exhaust gases to the combustible mixture within said intake manifold, a longitudinally movable member for controlling the position of said valvular means, a choke valve, and means connecting said choke valve with said member whereby said choke valve may be operated only when said valvular means are placed in position of maximum transfer of heat to said combustible mixture.

7. In combination with an internal combustion engine, an intake manifold, an exhaust manifold associated therewith and provided with valvular means for controlling the heating effect of the exhaust gases on the combustible mixture within said intake manifold, a carbureter choke valve, a longitudinally movable member for controlling said choke valve, and means co-operatively associating said valvular means with said longitudinally movable member whereby said valvular means are placed in position of maximum transfer of heat to the combustible mixture in advance of the closing of said choke valve.

8. In combination with an internal combustion engine, an intake manifold, an exhaust manifold associated therewith provided with valvular means for controlling the transfer of heat from the exhaust gases to the combustible mixture within said intake manifold, a lever for controlling the position of said valvular means, a longitudinally movable member slidably connected to said lever, a spring tending to hold said lever in fixed position in relation to said member, and a carbureter choke valve constantly urged towards open position by said spring and controlled by the longitudinal position of said member.

9. In combination with an internal combustion engine, an intake manifold, an exhaust manifold associated therewith provided with valvular means for controlling the amount of heat transferred from the exhaust gases to the combustible mixture within the intake manifold, a carbureter choke valve, a longitudinally movable member, controlling means for said valvular means slidably connected to said member, controlling means for said choke valve slidably connected to said member, and spring means tending to hold the first mentioned controlling means in relatively fixed position relative to said member and tending to hold the last mentioned controlling means in relatively fixed position relative to said manifold.

10. In combination with an internal combustion engine, an intake manifold, an exhaust manifold associated therewith provided with a valve for controlling the flow of exhaust gases in relation to said intake manifold, a carbureter choke valve, a longitudinally movable member, controlling means for the first mentioned valve slidably associated with said member, controlling means for said choke valve slidably associated with said member, and spring means tending to separate said controlling means.

11. In a manifolding system for an internal combustion engine, a valve for directing exhaust gases into contact with the intake manifold, a lever for controlling the position of said valve, a rod slidably co-operating with said lever and provided with a spring constantly urging said lever towards a stop thereon, a second lever co-operatively associated with the carbureter choke valve and constantly urged to open position by said spring, and a second stop on said rod for overcoming the force of said spring and closing said choke valve.

12. In combination with an internal combustion engine, an intake manifold, an exhaust manifold associated therewith provided with a valve for controlling the flow of exhaust gases in relation to said intake manifold, a longitudinally movable control member provided with a stop, control means for said valve slidably engaging said member, a carbureter choke valve provided with control means slidably engaging said member, a stop for the last mentioned control means, spring means constantly urging the first mentioned control means towards the first mentioned stop and constantly urging said last mentioned control means towards the last mentioned stop, and additional stops for limiting the action of said spring means upon longitudinal movement of said member.

13. In a manifold system for an internal combustion engine, a pair of valves within the exhaust manifold constrained to simultaneous movement, resilient means for controlling the position of said valves, a carbureter choke valve constantly urged towards open position by said resilient means, and means co-operating with said resilient means for closing said choke valve subsequent to the opening of said first valves.

14. In combination with an internal combustion engine, an intake manifold, an exhaust manifold associated therewith provided with a pair of inter-connected valves for directing the exhaust gases towards and away from said intake manifold, a longitudinally movable control member, a lever on one of said valves slidably connected to said member, a stop on said member, a carbureter choke valve, means for controlling the position of said choke valve slidably connected to said member, a stop for limiting the open position of said choke valve, spring means encircling said member tending to force said lever against the first mentioned stop and said choke valve controlling means against the last mentioned stop, a stop for limiting the closed position of said valves, and a stop on said member whereby said valves are fully operated by a limited movement of said member and said choke valve is fully operated during a further movement of said member.

Signed by me at Detroit, Michigan, U. S. A., this 23rd day of August, 1926.

GEORGE R. DAVENPORT.